United States Patent [19]
Kompelien

[11] 3,749,934
[45] July 31, 1973

[54] THERMOSTAT WITH PROJECTION FOR THERMALLY ISOLATED SWITCH MEANS

[75] Inventor: Arlon D. Kompelien, Richfield, Minn.

[73] Assignee: Honeywell Inc., Minneapolis, Minn.

[22] Filed: Aug. 23, 1972

[21] Appl. No.: 283,015

[52] U.S. Cl................. 307/117, 219/501, 307/252
[51] Int. Cl. .......................................... H01h 37/12
[58] Field of Search................ 219/501; 174/DIG. 5; 317/100; 165/28; 236/90; 307/149, 116, 117, 252 B

[56] References Cited
UNITED STATES PATENTS
3,614,391  10/1971  Lauck ................................. 219/501
3,511,972  5/1970  Shaffer, Jr. ......................... 219/501
3,564,206  2/1971  Lauck ................................. 219/501

Primary Examiner—Herman J. Hohauser
Attorney—Lamont B. Koontz and Alfred N. Feldman

[57] ABSTRACT

A solid state type of thermostat that utilizes a switch means, such as a triac, for control of a remote ambient temperature altering means is disclosed. The solid state switch means or triac generates sufficient heat so that it requires isolation from the balance of the thermostat. In the present invention, the switch is isolated by placing it in a projection that is adapted to be inserted through a hole in the wall upon which the thermostat is mounted.

7 Claims, 3 Drawing Figures

PATENTED JUL 31 1973          3,749,934

THERMOSTAT WITH PROJECTION FOR THERMALLY ISOLATED SWITCH MEANS

CROSS REFERENCE TO RELATED APPLICATION

The present application is being filed on even date with an application directed to a related invention by Nathaniel Robbins Jr. and which is entitled "Thermostat With Thermally Isolated Switch Means". Both applications are assigned to the assignee to the present invention.

BACKGROUND OF THE INVENTION

Since the advent of solid state technology and integrated circuits, a large amount of design effort has been placed on improving thermostats by replacing conventional bimetal sensing elements with temperature responsive resistors, such as thermistors. These systems also utilize switch means, such as solid sate switches in the form of silicon controlled rectifier or triacs, as output switch means for the control system within the thermostat itself. The heat generated by the solid state components have a tenancy to interact with the temperature sensing element and various design techniques have been used to try and overcome this problem. In some thermostat designs, the temperature sensitive resistor has been isolated in the thermostat housing, by insolating material, and by other similar means. These arrangements have not proved to be wholly satisfactory and the heat generated by the solid state output switches in the thermostat are still considered to be a problem.

SUMMARY OF THE INVENTION

The present invention is directed to an improved thermostat using a solid state output siwtch which is completely isolated from the balance of the thermostat by placing the switch in a projection that passes through a hole in the wall upon which the thermostat is mouned. The projction allows the solid state output switch to be mounted back in a hollow space within the wall behind the thermostat. The normal thermostat housing covers the hole and the projection so that the thermostat appearance is not affected. In the preferred embodiment disclosed, the switch is a triac that is mounted in a tubular projection which can be annular in cross section and which projects substantially the entire distance back into a conventinal wall structure. This places the end of the projection approximately three inches from the mounting wall surface. This isolates the heat generated by thw switch means from the balance of the thermostat. By providing a projection, such as a tubular member or annular tubular projection, the solid state switch can be mechanically protected within the wall structure.

DESCRIPTION OF THE PREFERRED EMBODIMENT

Figure 1:
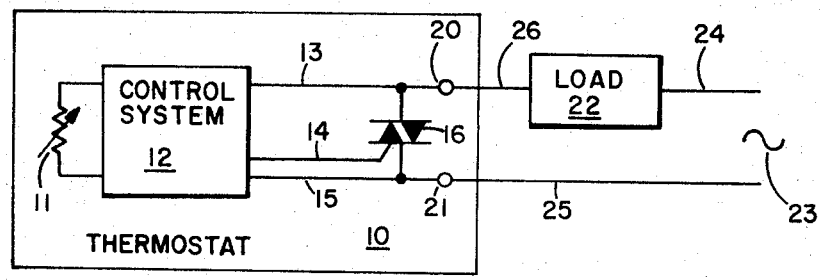
FIG. 1 is a schematic representation of a prior art type of thermostat.
Figure 2:
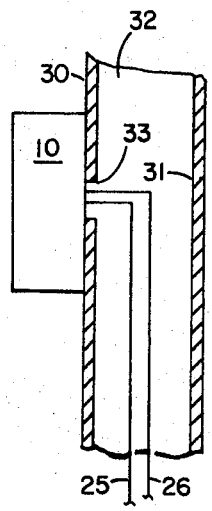
FIG. 2 is a representation of the prior art thermostat mounted on a conventional wall.

The present invention has particular utility in the solid state thermostat art and can best be understood when a prior art type of device is disclosd, as in FIGS. 1 and 2. In FIG. 1 a prior art thermostat 10 is disclosed having a temperature sensing element 11, in the form of a negative temperature coefficient resistor, that operates into a control system 12. The control system 12 has three conductors, 13, 14, and 15 which are connected to an electric switch means or triac 16. The conductors 13 and 14 are also connected to pair of terminals 20 and 21 which are connected in turn across the triac 16. A control input for triac 16 is provided on the conductor 14. The terminals 20 and 21 are connected through a conventional ambient altering means or load 22, to a source of aternating current potential 23 by conductors 24, 25, 26. A detailed disclosure of this type of system can be found in a United States patent application, Ser. No. 169,565 filed on Aug. 5, 1971 by B. H. Pinckaers and entitled "Condition Responsive Circuit With Limited Internal Dissipation". Also, this type of prior art thermostat could be of a type disclosed in the U.S. Pat. No. 3,243,609 to A. D. Kompelien. Both the Pinckaers application and the Kompelien patent are assigned to the assignee of the present invention.

The prior art device of FIG. 1 forms a complete thermostat and control system so that the triac 16 is triggered into conduction to energize the load 22 from the alternating current voltage source 23 whenever the negative temperature coefficient resistor 11 indicates a deviation of the ambient temperature from the temperature set into the thermostat 10. This type of thermostat includes the triac 16 within the thermostat housing itself, and the heat generated by the operation of triac 16 has been found to undesirably affect the control function of thermostat 10. Isolating the heat generating output switch or triac 16 within the thermostat 10 is very difficult in a small thermostat construction and has created a substantial design problem.

In FIG. 2, the thermostat 10 is disclosed as mounted on a conventional wall structure having two wall surfaces 30 and 31 separated by a conventional stud or structure 32. An opening 33 is provided in the wall surface 30 so that conductors 25 and 26 can be run to a remote location to control the load 22. The prior art device disclosed in FIG. 2 has been provided as a means for comparison with the invention, as disclosed in oen of its preferred forms in FIG. 3.

The thermostat of the present invention is disclosed at 10' and is mouned on wall surface 30 through a hole 33' by means of a pair of screws 34 and 35. Wall surface 30 is separated from a second wall surface 31 by the stud 32 as a conventional wall structure. In an ordinary wall structure the surfaces would be separated by approximately 3⅝ inches, which is the depth of a conventional wood stud. The distance between the wall surfaces 30 and 31, as described, is conventional, as is the mounting of thermostat 10' to the wall surface 30.

The inventive concept revolves around the projection means 40 that is attached to the thermostat 10' in any convenient manner. The projection means 40 passes through the hole 33' and generally could be referred to as a tubular projection means. The projection means 40, in the preferred embodiment, is annular in cross section, hacing a wall 41 and an end 42 which forms a protection for a chmaber 43 that includes the triac 16. The chamber 43 is further formed by a barrier 44 that has an opening 45 through which conductors 13, 14, and 15 pass to the triac 16. The type of solid state switching contained in the chamber 43 is not particularly material and could be a pair of silicon controlled rectifiers of the type disclosed in the early mentioned Kompelien patent.

The conductors 25 and 26, that connect the thermostat 10' to the load 22 are disclosed as passing through the hole 33' to the thermostat 10'. The conductors 25 and 26 could pass into the end 42 of the projection means 40 and then be conducted through the opening 45 along with the conductors 13, 14, and 15, if desired. Also, theprojection means 40 does not have to project the full depth of the space between the wall surfaces 30 and 31, but could be shortened so as to fit into a wall of slenderer depth than that previously described. The only requiste is that the solid state switch means be isolated at a sufficient distance from the temperature sensing and control means so as to have negligible effect on the accuracy of the thermostat. The projection means 40 can be of any configuration as far as cross section is concerned, and could even be curved to provide additional length into the wall space made up berween the wall surfaces 30 and 31. If an arcuate configuration of projection means 40 was provided, it could be rotated through the hole 33' into the space between the wall surfaces 30 and 31 thereby adding length and separating the triac 16 even further from the temperature sensing element 11 contained in the thermostat 10'.

Figure 3:
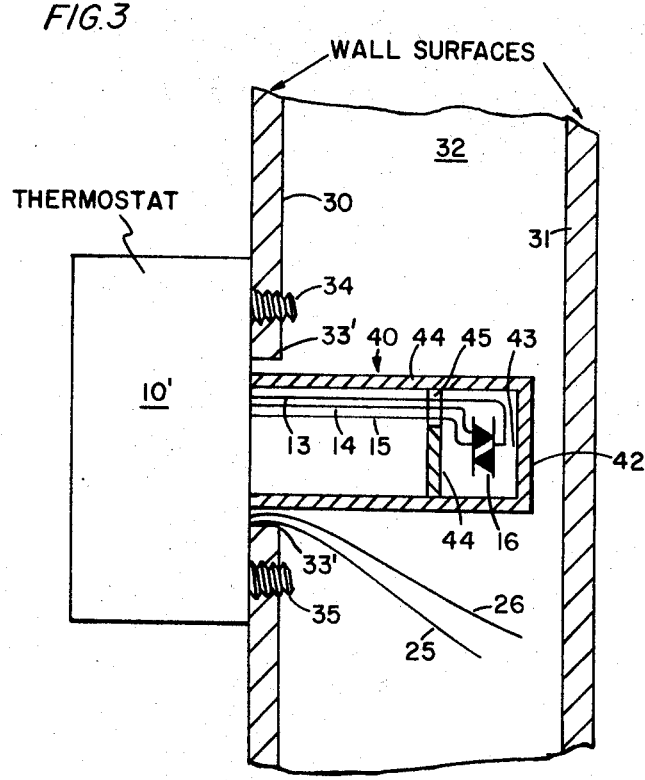
FIG. 3 is a representation of one embodiment of the present invention.

It is obvious that many variations on the structure of the projection means 40 could be provided with different types of materials, cross sections, and shapes. FIG. 3 shows a simple preferred embodiment that could be readily installed in conventional construction. The applicant wishes to be limited in the scope of his inventions soley by the scope of the appended claims.

The embodiments of the invention in which an exclusive property or right is claimed are defined as follows:

1. A thermostat, including: temperature sensing and control means mounted within thermostat housing means and exposed to an ambient temperature to be controlled; said housing means including projection means to isolate any heat generated within said projection means from said temperature sensing and control means with said projection means adapted to project into a wall upon which said thermostat is mounted; electric switch means including electrical connection means electrically connecting said switch means to said control means with said switch means mounted within said projection means; and said switch means operated by electrical signal transmitted to said switch means by way of said connection means and with said switch means adapted to control an ambient temperature altering means remote from said thermostat.

2. A thermostat as described in claim 1 wherein said projection means is a tubular member projecting into said wall to a depth sufficient to isolate any heat generated by said switch means from affecting said temperature sensing means.

3. A thermostat as described in claim 2 wherein said switch means is solid state switch means with said switch means mounted within said tubular member.

4. A thermostat as described in claim 3 wherein said switch means is mounted within said tubular member at an end of said tubular member as remote as possible from said temperature sensing means.

5. A thermostat as described in claim 4 wherein said switch means is a triac and said tubular member is annular in cross section.

6. A thermostat as described in claim 4 wherein said tubular member includes a heat isolating barrier between said switch means and said temperature sensing and control means.

7. A thermostat as described in claim 6 wherein said switch means is a triac and said tubular member is annular in cross section.

* * * * *